July 17, 1962 M. LOSHER 3,045,156

SERVOSYSTEM INCLUDING QUADRATURE SIGNAL GATE

Filed July 3, 1958

Inventor
MORTON LOSHER
By Philip M. Bolton
Attorney

United States Patent Office 3,045,156

Patented July 17, 1962

3,045,156

SERVOSYSTEM INCLUDING QUADRATURE SIGNAL GATE

Morton Losher, Bergenfield, N.J., assignor to International Telephone and Telegraph Corporation, Nutley, N.J., a corporation of Maryland Filed July 3, 1958, Ser. No. 747,557
4 Claims. (Cl. 318—28)

Figure 1:
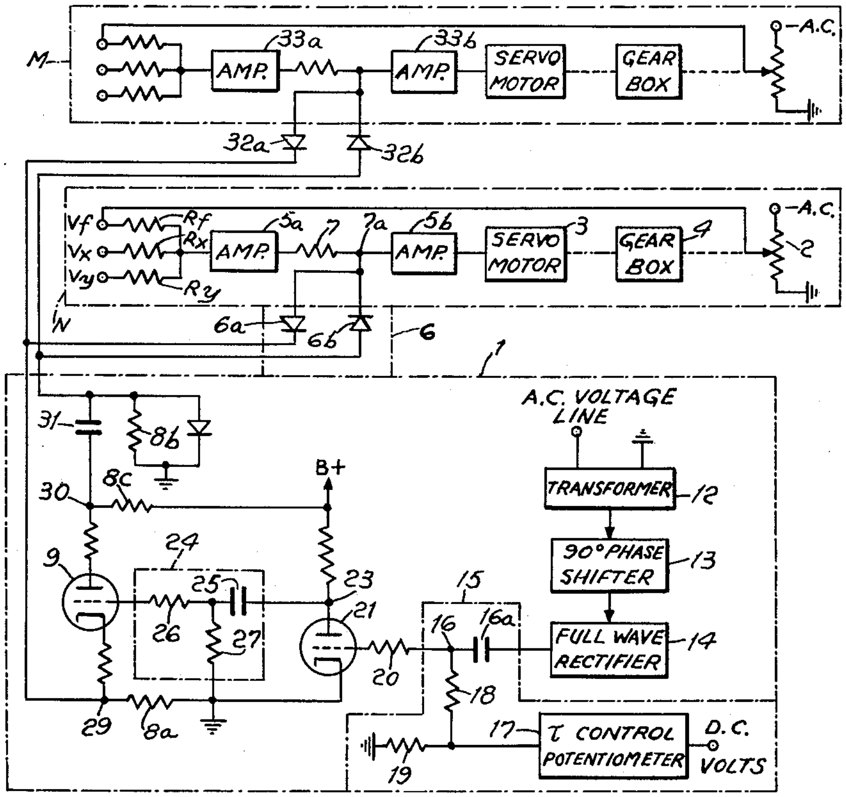

This invention relates to quadrature signal rejection systems and more particularly to such systems for use with servo systems and producing signals to reject quadrature voltage in a plurality of servo systems such as in an analog computer or simulator.

In a positioning servo mechanism involving a servo amplifier, a servo motor and a positioning feedback impedance having reactance, an undesirable quadrature voltage component is developed in the feedback impedance and added, at the input to the servo amplifier, to the in-phase voltages which are applied to that input and which serve to energize the servo motor. This quadrature voltage is amplified by the servo amplifier along with the in-phase voltage and fed to the field coils of the servo motor along with the desirable in-phase voltage and since no motor torque is produced by this amplified quadrature voltage, it remains in the field coils causing heating and may even saturate the amplifier if the amplifier gain is great enough.

In the past, quadrature rejection between stages of a servo amplifier has been accomplished by interposing a push-pull circuit arrangement with a transformer coupling its input and output in such a manner as to "buck-out" the undesirable quadrature voltage between said amplifier stages. In some systems employing numerous servo amplifiers functioning in numerous servo loops, it has been required to employ such a push-pull quadrature rejection circuit arrangement in each servo loop. Obviously, such prior systems having many servo loops require many such quadrature rejection circuits.

Therefore, it is the principal object of this invention to provide a simple system for rejecting quadrature voltage (for example, by shunting it to ground) suitable for use with a plurality of servo systems.

It is another object to provide a minimum of gating signals serving to reject quadrature voltage in a plurality of servo systems.

It is another object to provide a gate between stages of a servo amplifier whereby in-phase and 180 degrees out-of-phase voltages may be passed and quadrature voltage attenuated so that said quadrature voltage does not appear at the output of said amplifier.

It is another object to provide means for electrically shunting a line to ground during intervals of controlled duration.

It is the principal feature of this invention to employ controlled shunting means between stages of a servo amplifier for providing short circuit paths to ground for positive and negative signals at all intervals except certain intervals in phase with line voltage.

It is another feature to employ diodes each coupled to said amplifier and to ground via normally low impedances and having pulse generating circuits coupled to said impedances for increasing the voltage drop across them to thereby prevent conduction by said diodes during controlled intervals.

It is a further feature to generate positive pulses coincident with positive excursions of line voltage and to generate negative pulses coincident with negative excursions of line voltage and to apply said positive and said negative pulses to said impedances to thereby prevent said diodes from conducting.

Figure 2:
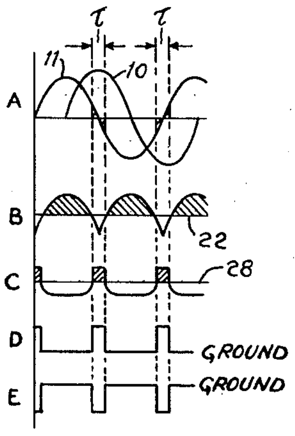

Other and further features and objects of this invention will be more apparent from the following description of a specific embodiment taken with reference to the figures, in which:

FIG. 1 represents a plurality of servo systems each having means coupled between stages of its servo amplifier for gating the signal between stages so as to reject voltage in quadrature with line voltage; and FIG. 2 represents waveforms from which an understanding of the operation of the gating pulse generator and the method of rejecting quadrature voltage may be had.

Turning first to FIG. 1, there is shown a plurality of servo loops such as M and N each having voltage inputs, a multi-stage servo amplifier, a servo motor driving a gear box in turn positioning a feedback potentiometer and each coupled to gating pulse generator 1 via suitable unidirectional conductive devices such as diodes at the output of the first stage of its associated servo amplifier. Since the action of rejecting quadrature voltage between amplifier stages is the same with regard to each servo loop, the operation of only one servo loop, namely N, in conjunction with gate generator 1 will be herein described.

Servo loop N is actuated by in phase or 180-degree out of phase voltages $V_x$ and $V_y$ which are the analog representation of positive or negative factors, respectively, applied to input impedances $R_x$ and $R_y$, and feedback impedance $R_f$ is fed a voltage from positioning feedback impedance 2 driven by the shaft output from servo motor 3 via gear box 4. Position feedback impedance 2 may be a wire-wound potentiometer or any other suitable potentiometer and is energized by 180 degree out of phase A.C. line voltage (denoted-A.C.) and having movable means coupled thereto for obtaining a voltage $V_f$ varying with the rotation of the shaft output from motor 3. Since wire-wound potentiometers yield a reactance component to an applied frequency signal, there will exist a quadrature voltage component in $V_f$ along with the desirable 180 degree out-of-phase voltage which constitutes $V_f$. There also may be quadrature voltage components in $V_x$ and $V_y$, if these voltages are obtained from other potentiometers having reactance. Thus, quadrature voltage components may exist at the input to first stage *5a* of the servo amplifier and it is one purpose of this invention to attenuate said quadrature voltage while at the same time to pass in-phase or 180 degree out-of-phase voltages which serve to energize servo motor 3. For this purpose gating pulse generator 1, diodes 6 and impedance 7 are provided, said impedance and diodes being coupled between stages 5*a* and 5*b*, as shown, one of said diodes electrically directed towards coupling junction 7*a* and the other directed away from said junction. The purpose of diodes 6*a* and 6*b* is to shunt positive and negative A.C. signals to ground via low impedances 8*a* and the combination of 8*b* and 8*c* respectively, during intervals when tube 9 is not conducting.

Referring to waveform A in FIG. 2, there is shown in-phase line voltage 10, quadrature voltage 11 and gating interval $\tau$, which represents the interval during which tube 9 conducts. As shown in waveform A, during the interval $\tau$, voltage 10 is at maximum positive or negative excursions while voltage 11 is at minimum excursions. Thus, if gating pulses are employed having an interval represented by $\tau$ and these pulses block the ground shunts provided by diodes 6*a* and 6*b*, signals to servo motor 3 which are in-phase or 180 degrees out-of-phase with line voltage, will be passed to servo motor 3 and signals in quadrature therewith will be attenuated.

Referring next to gate pulse generator 1 and waveforms B, C, D, and E, an understanding of the operation of pulse generator 1 may be had. In-phase A.C. line voltage is applied to transformer 12 which in turn feeds 90-degree phase shifter 13 whose output is in quadrature with the in-phase line voltage applied to transformer 12. This quadrature voltage is then full wave rectified and clamped by full wave rectifier 14 and clamping circuit 15 producing waveform B at junction 16. Clamping circuit 15 may, for example, consist of a capacitance 16*a*, coupling the output of rectifier 14 and junction 16, impedances 18 and 19 coupling junction 16 to ground and a $\tau$ control potentiometer 17 for applying controlled D.C. volts between said impedances. The voltage described by waveform B at junction 16 is then applied via impedance 20 to the grid of triode 21; the action of clamping circuit 15 and the characteristics of triode 21 being such that triode 21 conducts only during the shaded portion of waveform B which lies above level 22 shown in the waveform. Thus, the voltage at junction 23 coupled to the plate of triode 21 is described by waveform C, which, as shown, swings more positive during periods of non-conductance of triode 21. The voltage at junction 23 is applied to the grid of triode 9 via coupling network 24 which may consist of, for example, capacitance 25 and impedances 26 and 27. The characteristics of triode 9 are such that triode 9 conducts only during the shaded portion of waveform C which fall above level 28. When troide 9 conducts, the voltage at junction 29 increases blocking the shunt from the output of amplifier stage 5*a* via diode 6*a* for resistor 8*a* and thence to ground. Also, when triode 9 conducts, the potential at junction 30 which is applied to diode 6*b* via capacitance 31 decreases thus blocking the ground shunt for negative signals from the output of amplifier stage 5*a* via diode 6*b* and resistors 8*b* and 8*c*. The resistances coupled between the plate of tube 9 and junction 29, the resistance coupled between the cathode of tube 9 and 29, resistances 8*a*, 8*b* and 8*c* and the characteristics of triode 9 are such that the positive pulses produced at junction 29 and the negative pulses produced at junction 30 when thriode 9 conducts have the same absolute magnitude and are shown and described by waveforms D and E respectively, which show equal magnitude pulses swinging away from ground voltage.

Obviously, the magnitude of the positive and negative pulses shown in waveforms D and E must be sufficient to cause diodes 6*a* and 6*b*, respectively, to cease to conduct and therefore the magnitude of these pulses must bear a relationship to the maximum value of in-phase or 180 degrees out-of-phase voltages appearing in the output of amplifier stage 5*a*. These pulses must be greater in magnitude than the maximum excursions of said in-phase or 180 degrees out-of-phase voltages.

The pulse outputs from pulse gate generator 1 described by waveforms D and E are also applied to diodes 32*a* and 32*b*, which are coupled between stages 32*a* and 32*b* of servo loop M and the same action is accomplished with reference to servo loop M as hereinabove described with reference to servo loop N.

While there is described hereinabove a specific embodiment of the invention, other line driven gate pulse generating means and diode shunt circuits could be employed in place of those described without deviating from the spirit or scope of the invention as expressed in the claims.

I claim:

1. An alternating current servo system including means for rejecting signal components of improper phase, comprising a source of reference periodic signals having a reference period and reference phase; sources of first and second periodic signals having said reference period and having relatively variable amplitudes, said first signal being at said reference phase and said second signal being in phase opposition to said reference phase; servo means including means for producing feedback signals of variable amplitude and having said reference period; means for linearly combining said first, second, and feedback signals to produce an error signal; normally disabled gating means for directly and selectively transferring said error signal to said servo means; means coupled to said reference signal source for deriving control pulses in coincidence with the peak excursions of said reference signals, said pulses having a duration which is small in relation to one-fourth of said period; and means responsive to said control pulses for enabling said gating means for the duration of each said control pulse whereby said error signal is transferred to said servo means only during the duration of said control pulse.

2. An alternating current servo system including means for rejecting signal components of improper phase without interstage transformer coupling and compensating networks comprising a source of reference periodic signals having a reference period and phase; sources of first and second periodic signals having said reference period and having relatively variable peak amplitudes, said first signal having said reference phase, said first and second signals being in phase opposition; servo means including means for producing feedback signals of variable amplitude, said feedback signals having said reference period; means for linearly combining said first, second and feedback signals to produce an error signal; variable attenuating means coupled to the output of said linearly combining means; means responsive to said reference signals for deriving control pulses in coincidence with the peak excursions of said reference signals, said control pulses having a duration which is small in relation to one-fourth of said reference period; means responsive to said control signals for increasing the resistance to A.C. signals of said attenuating means thereby relatively decreasing the attenuation of said error signal at the output of said combining means; and means for directly applying said variably attenuated error signal to said servo means.

3. A servo system as in claim 2 wherein said reference signal, said first and second signals, and said feedback signals, are all sinusoidal signals at the same frequency.

4. A servo system according to claim 3 wherein said control pulse deriving means further comprises means coupled to said reference signal source for shifting the phase of said reference signals by an amount substantially equal to one-fourth of said reference period, means coupled to said phase shifting means for producing pulses in coincidence with the excursions of said phase shifted signal through a reference amplitude.

References Cited in the file of this patent

UNITED STATES PATENTS

| | | |
|---|---|---|
| 2,425,133 | Strickland | Aug. 5, 1947 |
| 2,446,532 | Edwards | Aug. 10, 1948 |
| 2,470,412 | Piety | May 12, 1949 |
| 2,554,987 | Hogle | May 29, 1951 |
| 2,595,675 | Jaynes | May 6, 1952 |
| 2,692,336 | Holmes | Oct. 19, 1954 |
| 2,761,130 | Kibler | Aug. 28, 1956 |
| 2,782,307 | Von Sivers et al. | Feb. 19, 1957 |
| 2,868,969 | Inniss | Jan. 13, 1959 |
| 2,873,364 | Huddleston et al. | Feb. 10, 1959 |